United States Patent
Bartmann

[15] 3,668,742
[45] June 13, 1972

[54] COUPLING FOR WEBS

[72] Inventor: Otto Bartmann, 6 Waldstr., Birgel, Duren, Germany

[22] Filed: July 23, 1970

[21] Appl. No.: 57,446

[30] Foreign Application Priority Data

July 24, 1969 Germany.....................G 69 29 255.3

[52] U.S. Cl. ...........................................................24/33 C
[51] Int. Cl. .........................................................F16g 3/02
[58] Field of Search...................24/90 TS, 31 H, 33 M, 33 C, 24/33 P, 33 A, 33 R; 74/231 J

[56] References Cited

UNITED STATES PATENTS

| | | | |
|---|---|---|---|
| 2,629,909 | 3/1953 | Hall | 24/33 C |
| 1,271,444 | 7/1918 | Diamond | 24/33 C |

FOREIGN PATENTS OR APPLICATIONS 1,494,161  7/1967  France....................................24/33 C

OTHER PUBLICATIONS

1808995 German Printed Application 2/1970 SCAPA Dryers pgs. 3 & 14.

Primary Examiner—Donald A. Griffin
Attorney—Dawson, Tilton, Fallon & Lungmus

[57] ABSTRACT

A coupling is disclosed for securing adjacent end web portions without overlap of the webs. The coupling includes series of spaced loops which project endwise from the end portions of the webs and are held in intermeshing relationship by a connector which is threaded through the intermeshing loops and comprises a pair of parallel rods which are freely movable related to one another and convexly curved in cross-sectional profile at least where the rods make contact with each other and which are enclosed in a resilient tube.

9 Claims, 5 Drawing Figures

PATENTED JUN 13 1972 3,668,742

Inventor:
Otto Bartmann
By: Dawson, Tilton, Fallon & Lungmus
Attys.

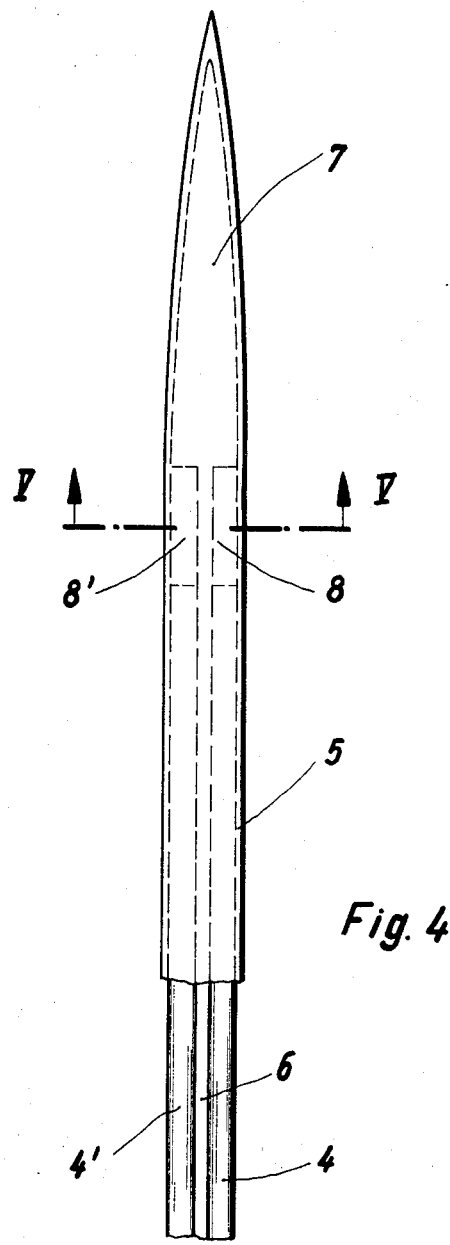

COUPLING FOR WEBS

This invention relates to belt and web couplings enabling different belts or webs or different end portions of a given belt or web to be releasably coupled end to end without overlap.

The invention has been made primarily for embodiment in endless wires and felts for paper or board-making machines.

A known and useful type of coupling is one in which each of the belt or web ends to be coupled together is provided with a series of spaced wire loops and the different series of loops are held in intermeshing relationship by a rod which is threaded through the intermeshing loops. The different series of coupled loops can articulate about the connecting rod and an endless belt or web formed by coupling the ends of one or more webs or belts by means of such a coupling or couplings can therefore travel over supporting and driving rollers of small radius. There is need for improvement in this type of coupling however. When used in a heavy duty endless machine belt or web, e.g., a felt or wire of a paper-making machine, the connecting rod is subject to such considerable surface wear and tractional force that it is liable sooner or later to become deformed so that the machine felt or wire does not run truly at the seam, and the connecting wire or rod is even liable to break, with risk of serious damage to the machine and of injury to personnel. The liability to failure of the connecting rod is undoubtedly increased if the seam becomes contaminated with corrosive substances or if dirt or foreign matter accumulates in the seam.

According to the present invention, end portions of a belt or web or end portions of different belts or webs are coupled without overlap by a coupling comprising series of spaced loops which project endwise from the said end portions and are held in intermeshing relationship by a connector which is threaded through the intermeshing loops and comprises a pair of parallel rods which are convexly curved in cross-sectional profile at least where the rods make contact with each other and which are enclosed in a resilient tube.

A coupling as above defined has been found to have a longer useful life than the known couplings of similar type as hereinbefore referred to. The connector is very resistant to deformation. In general, any deformation is restricted to denting of the resilient outer tube. If this denting occurs it does not cause difficulty in removing the connector because the rods can be withdrawn first, if required one at a time, leaving the tube for withdrawal afterwards.

The outer tube protects the vital contacting bearing surface of the rods from dust and other deposits, also from steam. By virtue of the protection afforded by the outer tube, the rods can be made from less expensive material than would otherwise be required. By way of example, the rods may be made from a material of high mechanical strength which is not corrosion-resistant, such as steel cord.

Notwithstanding that the connector comprises two relatively movable bearing rods, it is insertable into and withdrawable from connecting position, as a unit, and coupling and uncoupling can therefore be very easily accomplished.

Another important advantage of the invention is that if lubricant is applied to the relatively sliding surfaces of the rods the outer tube helps to retain the lubricant as well as to keep the lubricant free from fouling by dirt. It is very advantageous for lubricant to be present within the outer tube, and particularly between the rods. According to a particular embodiment, the rods carry a lubricant film of synthetic plastics material, at least at those zones which are in sliding contact. The rods may actually be attached or caused to adhere to each other by means of a lubricant or a rubber-like synthetic plastics or natural material. Polytetrafluoroethylene has proved a suitable material for this purpose. Such attachment facilitates insertion of the rods into the outer tube and makes it easier to ensure that the rods are parallel with each other in the plane of the seam when the connector is threaded through the loops.

The rods may be of any cross-sectional dimensions suited to the circumstances of use. The term "rod" is not to be taken as implying any particular minimum thickness but is used broadly to include an element which could properly be called a wire. The rods may be of composite structure, e.g., they may be formed of braided strands. Preferably the rods are each formed in one piece, which may however be coated.

The outer tube requires to be resilient so that tractional forces across the seam are transmitted to the rods. Preferably the outer tube is made of a resilient synthetic plastics material. Examples of suitable materials for the outer tube are polytetrafluoroethylene, polyester and polyamide. The presence of the outer resilient tube substantially reduces wear of the interconnected series of loops.

The outer tube is preferably sealed, e.g., by welding, at one or both ends. In this sealing operation, at least one end of the outer tube may be drawn out or otherwise formed to a taper to facilitate threading of the connector through the loops. Alternatively or in addition, a separate cap piece may be fitted to the assembly of rods, which cap piece may itself be pointed.

The invention particularly includes a felt or wire of a paper or board-making machine, such felt or wire comprising a single length of material of appropriate composition and structure (such length of material constituting a "web" within the meaning of that term as used herein), the end portions of such length of material being jointed by a coupling as herein defined. The seam of such a felt or wire is very resilient and in consequence there is less tendency than when using known couplings for undulations to appear in the felt or wire. Of course it is possible to form a felt or wire from two or more lengths of material by incorporating two or more seam couplings.

Certain embodiments of the invention, selected by way of example, will now be described with reference to the accompanying drawings in which:

FIG. 4 shows part of a connector; and

FIG. 5 is a cross-section on line V-V of FIG. 4.

Figure 1:
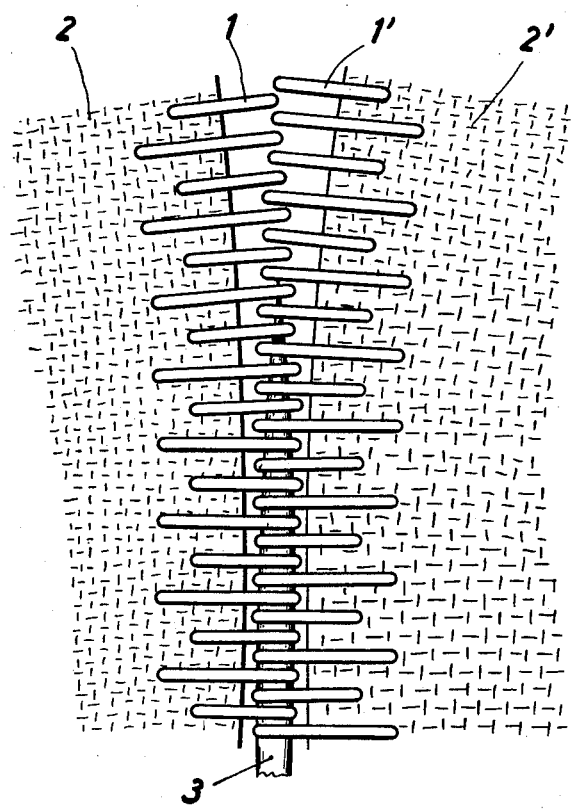
FIG. 1 is a plan view of part of a paper machine felt or wire according to the invention.
Figure 2:
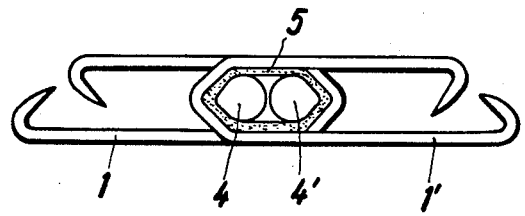
FIG. 2 is a cross-sectional view showing two coupling loops and a threaded connector as used in the seam of the felt or wire shown in FIG. 1.

Referring firstly to FIGS. 1 and 2: the felt is provided with two series of spaced loops 1,1' which are connected to the end portions 2,2' of the web of material constituting the felt or wire. The loops project endwise from the opposed end portions of the felt or wire and the loops are held in intermeshing relationship by a connector 3 which is threaded through such loops, thereby making a hinge-like joint.

The connector 3 comprises two rods, 4,4' disposed side by side in parallel in the plane of the seam, and an outer tube 5. the rods 4,4 are freely movable relative to each other within the tube 5, even though the rods may be caused to adhere to each other by means of a lubricant to facilitate insertion of the rods into the outer tube. The rods 4,4' may, e.g., be composed of stainless steel with a polyamide coating or of polyamide monofilaments with a synthetic-resin-impregnated polyester coating. The outer tube 5 may be formed, e.g., of polytetrafluoroethylene. A lubricant may be provided inside the outer tube 5, preferably between the rods 4,4'. This lubricant may contain molybdenum disulphide and/or graphite or it may be a synthetic plastic material with lubricating properties, e.g., polytetrafluoroethylene. Alternatively the lubricant may be a conventional lubricant paint applied as a coating film to the rods 4,4'. Alternatively a rubber-like adhesive may be provided instead of a lubricant.

It will be noted that the rods 4,4' are not of circular section but their cross-sections are convexly curved at the sides where the rods are in bearing and sliding contact. Other cross-sectional shapes, e.g., an oval shape, are acceptable provided that the rods are rounded to permit sliding or rolling motion when the series of loops 1,1' hinge about the joint axis.

Figure 3:
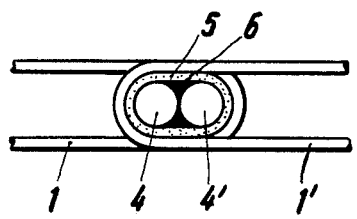
FIG. 3 is a cross-sectional view of coupling components of another embodiment of the invention.

FIG. 3 shows a construction in which the rods are of circular cross-section. In the FIG. 3 embodiment a lubricant or rubber-like adhesive is present within the outer tube and is marked 6.

Advantageously, the outer tube 5 is sealed or closed at least at one end. In the form of connector represented in FIG. 4 a pointed end cap 7 is fitted to form the end of the connector which is first to be introduced through the seam loops. As appears from the cross-sectional view (FIG. 5) the cap is formed with semi-cylindrical grooves 8,8' which receive end portions of the rods 4,4'. The cap could be formed with bores instead of the grooves 8,8'.

I claim:

1. A belt or web coupling whereby end portions of a belt or web or end portions of different belts or webs are coupled without overlap, said coupling comprising series of spaced loops which project endwise from the said belt or web end portions and are held in intermeshing relationship by a connector which is threaded through the intermeshing loops, such connector comprising a pair of parallel rods which are convexly curved in cross-sectional profile at least where the rods make contact with each other and which are enclosed in a resilient tube and freely movable relative to each other within said tube.

2. A belt or web coupling according to claim 1 wherein the said resilient tube is made of synthetic plastics material.

3. A belt or web coupling according to claim 2, wherein the rods bear films of synthetic plastics lubricant at least at those zones where the rods are in contact with each other.

4. A belt or web coupling according to claim 3, wherein the said rods are attached or caused to adhere to each other by means of a synthetic plastics lubricant or rubber-like material.

5. A belt or web coupling according to claim 3, wherein the rods are attached to each other by polytetrafluoroethylene.

6. A belt or web coupling according to claim 3, wherein the resilient tube is formed of a thermoplastics material and one end of the tube has been heat sealed and drawn out to form a pointed connector end.

7. A belt or web coupling according to claim 5, wherein at least one end of the resilient tube is closed by an end cap having grooves or bores accommodating end portions of the said rods.

8. A belt or web coupling according to claim 3, wherein at least one end of the resilient tube is sealed or otherwise closed to enclose the corresponding ends of the rods.

9. A belt or web coupling according to claim 1, wherein lubricant is present within said resilient tube.

* * * * *